United States Patent
Liktor et al.

(10) Patent No.: US 9,767,602 B2
(45) Date of Patent: Sep. 19, 2017

(54) TECHNIQUES FOR REDUCED PIXEL SHADING

(71) Applicant: INTEL CORPORATION, Santa Clara, CA (US)

(72) Inventors: Gabor Liktor, Karlsruhe (DE); Marco Salvi, San Francisco, CA (US); Karthik Vaidyanathan, Berkeley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 125 days.

(21) Appl. No.: 14/319,472

(22) Filed: Jun. 30, 2014

(65) Prior Publication Data

US 2015/0379761 A1    Dec. 31, 2015

(51) Int. Cl.
*G06T 15/80*    (2011.01)

(52) U.S. Cl.
CPC .................... *G06T 15/80* (2013.01)

(58) Field of Classification Search
None
See application file for complete search history.

(56) References Cited

U.S. PATENT DOCUMENTS

| | | | |
|---|---|---|---|
| 2008/0094412 A1* | 4/2008 | Jiao | G06T 15/005 345/621 |
| 2008/0165199 A1* | 7/2008 | Wei | G06T 15/005 345/506 |
| 2010/0194747 A1 | 8/2010 | Bronder et al. | |
| 2010/0302246 A1 | 12/2010 | Jiao et al. | |
| 2011/0261063 A1 | 10/2011 | Jiao | |
| 2012/0229460 A1 | 9/2012 | Fortin | |
| 2013/0021358 A1 | 1/2013 | Nordlund et al. | |
| 2014/0071124 A1* | 3/2014 | Kawahara | G06T 15/503 345/419 |
| 2015/0348283 A1* | 12/2015 | Clarberg | G06T 1/20 345/420 |
| 2016/0314615 A1* | 10/2016 | Kim | G06T 15/005 |

OTHER PUBLICATIONS

Liktor et al. ("Decoupled Deferred Shading for Hardware Rasterization", I3D '12 Proceedings of the ACM SIGGRAPH Symposium on Interactive 3D Graphics and Games, 2012, 8 pages).*
Ragan-Kelley, et al., "Decoupled Sampling for Graphics Pipelines", ACM Transactions on Graphics, vol. NN, Mar. 2011, 17 pages.
International Search Report and Written Opinion received for PCT Patent Application No. PCT/US2015/032801, mailed Aug. 27, 2015, 11 pages.

* cited by examiner

*Primary Examiner* — William A Beutel

(57) ABSTRACT

Various embodiments are generally directed to techniques for reducing processing demands of shading primitives in rendering a 2D screen image from a 3D model. A device includes a clipping component to clip a visible primitive of a 2D screen image derived from of a 3D model within a first area of the screen image covered by a shading pixel to form a polygon representing an intersection of the first area and the visible primitive; a first interpolation component to interpolate at least one attribute of vertices of the visible primitive to each vertex of the polygon; and a second interpolation component to interpolate color values of the vertices of the polygon to a point within a second area covered by a screen pixel of the screen image, the second area smaller than the first area and at least partly coinciding with the first area. Other embodiments are described and claimed.

16 Claims, 14 Drawing Sheets

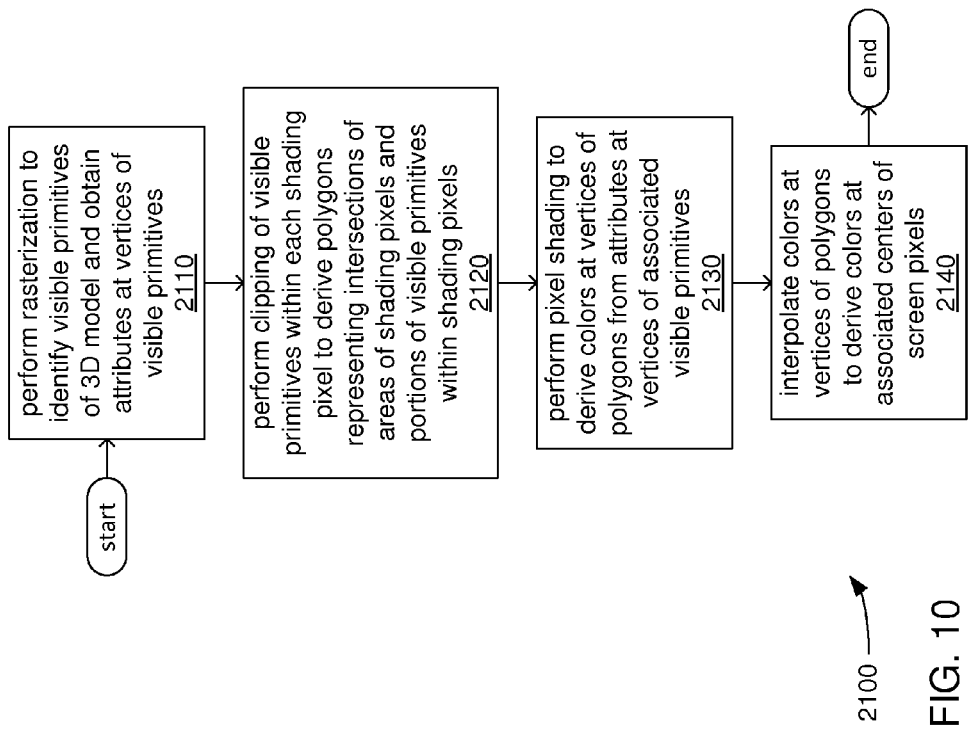

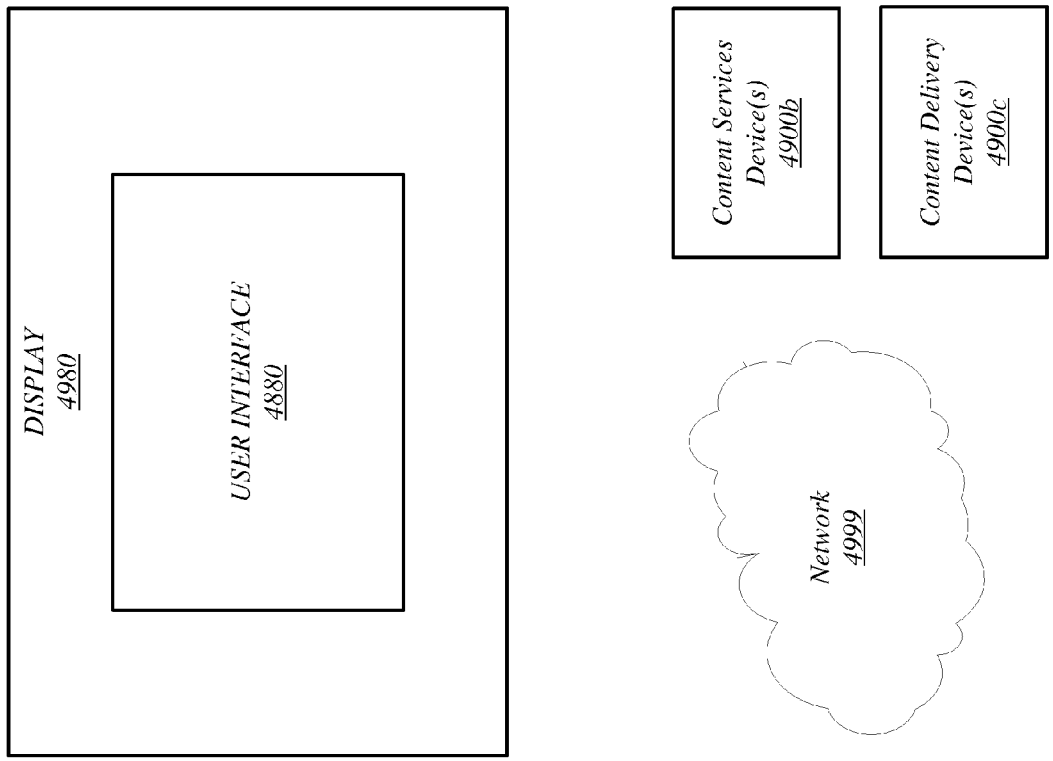
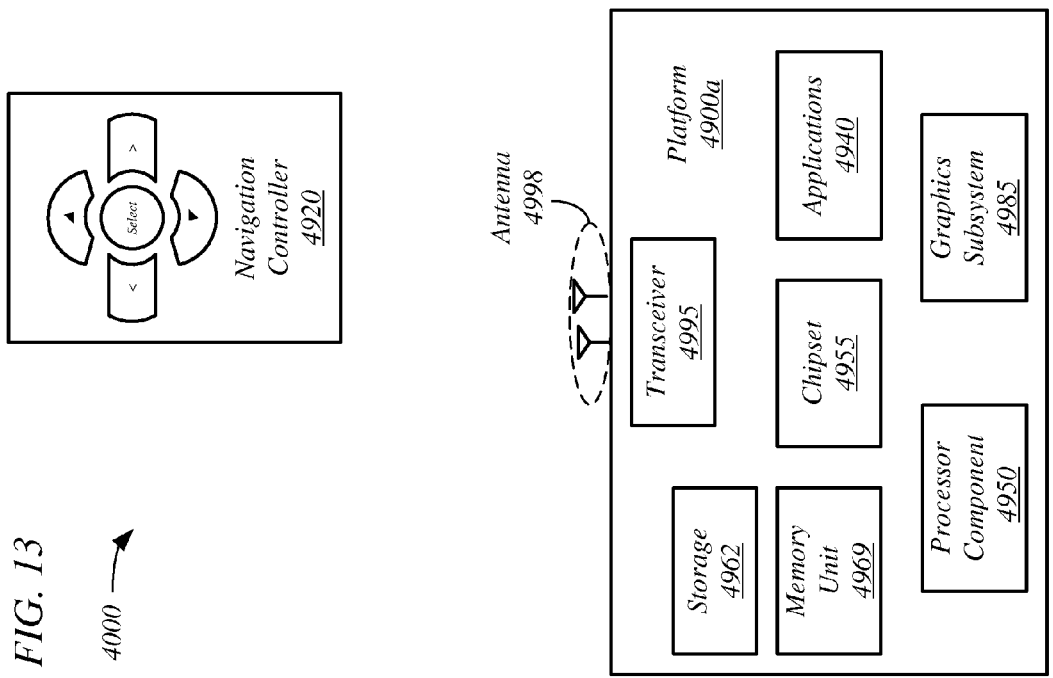
FIG. 13

TECHNIQUES FOR REDUCED PIXEL SHADING

BACKGROUND

The rendering of two-dimensional (2D) computer generated images (CGI) from three-dimensional (3D) models, once done only as part of performing relatively specialized computer-based functions, is increasingly employed in ever more aspects of operating computing devices. Specifically, although video games continue to present the most prevalent use of such images, their use has begun to take hold in websites and as part of graphical user interfaces (GUIs) of an ever increasing array of devices.

Although advances in the design of graphics rendering hardware and increases in the efficiency of rendering algorithms have enabled much of this increasing use of CGI based on 3D models, these advances and efficiency increases have not been sufficient to fully address the limits in processing and power resources that are typical in portable devices. Specifically, the work of shading graphics primitives to provide color and texture to objects in an image continues to demand considerable processing resources, which in turn, places considerable demands on the limited power resources afforded by the batteries and/or other power sources typically found in portable devices. Further, as the pixel resolutions of the displays incorporated into portable devices continue to increase, reductions that have been made in processing and power requirements have been overwhelmed by the exponential increase in the amount of shading caused by such resolution increases.

Previous efforts have been made to at least limit these increasing demands on power resources by attempting to directly reduce the amount of shading that is performed. However, such approaches have increased instances in which inaccurate or incorrect information is introduced as inputs into the shading, such as increased occurrences of extrapolation amidst the performance of interpolation calculations. Such inaccurate or incorrect information frequently results in the introduction of visual artifacts such as "twinkling" pixel colors, lack of smoothness in color transitions across curved surfaces of objects made up of multiple primitives, and/or misplaced shadow boundaries.

BRIEF DESCRIPTION OF THE DRAWINGS

FIGS. 10-11 each illustrate a logic flow according to an embodiment.

FIG. 13 illustrates another alternate embodiment of a graphics processing system.

DETAILED DESCRIPTION

Figure 1:
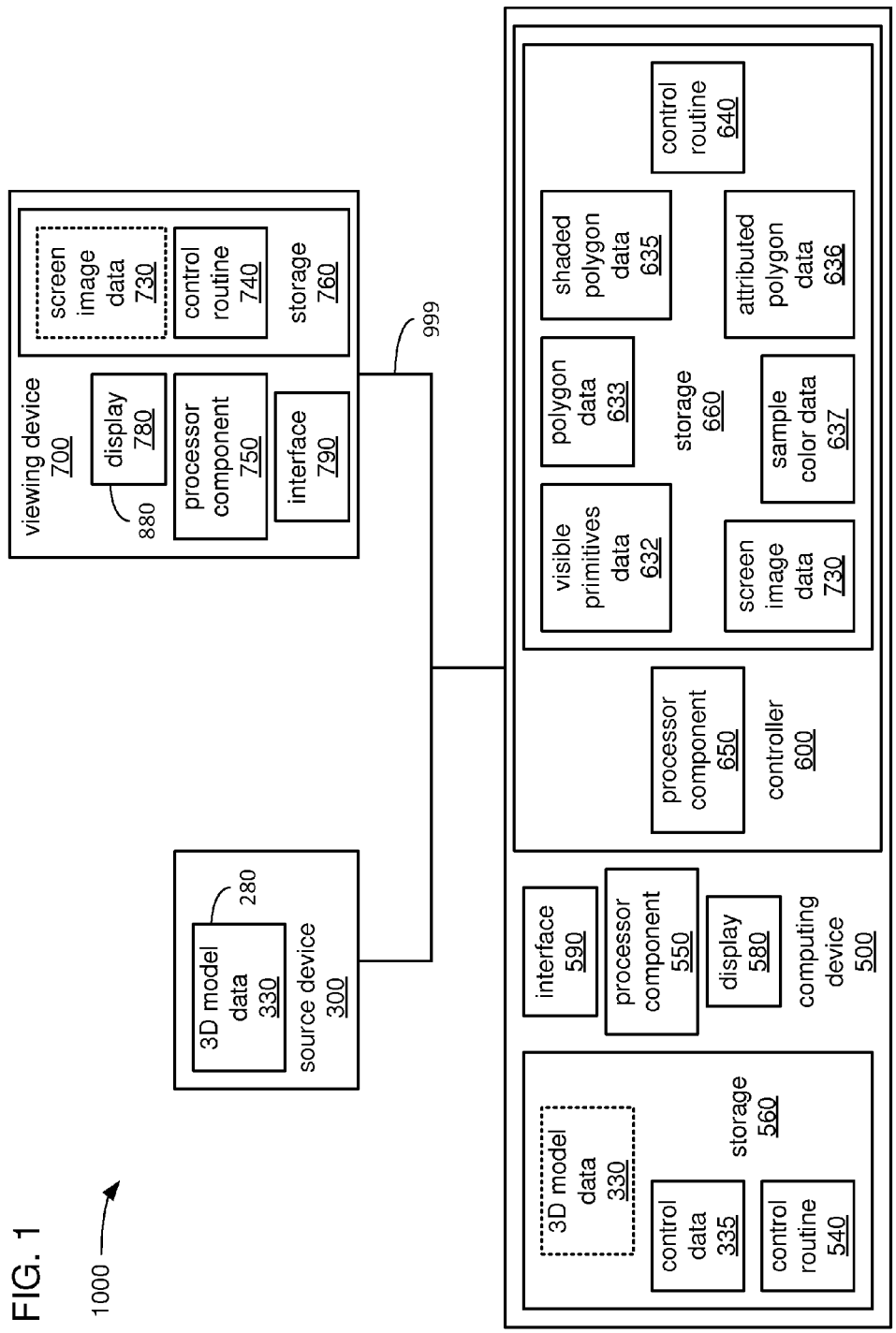
FIG. 1 illustrates an example embodiment of a graphics rendering system.

Various embodiments are generally directed to techniques for reducing the processing demands of shading visible primitives in rendering a 2D screen image from a 3D model through shading with shading pixels that are coarser than the screen pixels of the screen image, while also minimizing visual artifacts. Following rasterization, clipping of visible primitives is performed within each of the shading pixels to define polygons that represent intersections of the visible primitives with the areas covered by individual shading pixels. Attributes at the vertices of the visible primitives are interpolated to the vertices of the polygons, and then pixel shading is performed using the attributes at the vertices of the polygons to derive colors at the vertices of the polygons. Then, the colors at the vertices of the polygons are interpolated to derive the colors of the screen pixels.

In some embodiments, the rasterization may employ only a single sample allocated to each screen image pixel of the screen image (e.g., a single sample at the center of each screen image pixel) to identify the portions of the primitives of the 3D model that are visible from the perspective of the screen image at the locations of the screen image pixels. In other embodiments, the rasterization may employ any of a variety of types of sampling, including supersampling, stochastic sampling, multisampling, etc. in which there are multiple screen image samples allocated to each screen image pixel of the screen image to so identify the portions of the primitives of the 3D model that are visible. Prior to the rasterization, vertex shading may have been performed to derive attributes for each of the vertices of each of the primitives. As familiar to those skilled in the art, depending on the manner in which the objects of the 3D model are generated, the primitives may all be triangles or may be a mixture of different types of polygons. However, regardless of the shape of each primitive, all portions of each primitive must exist within a single plane. The attributes of the vertices of a primitive, including their relative positions, may define that primitive and the plane in which it exists.

Coinciding with the grid of screen pixels of the screen image may be a grid of shading pixels in which the shading pixels are coarser than the screen pixels such that each shading pixel covers a larger area than each screen pixel. In some embodiments, the shading pixels may be defined such that their boundaries correspond with boundaries of the screen pixels such that each shading pixel corresponds to an integer multiple of the screen pixels (e.g., each shading pixel may correspond to four of the screen pixels). Following the rasterization, clipping may be employed to derive one or more polygons within each shading pixel that represent intersections of the area of each shading pixel and the area within each shading pixel covered by a portion of a primitive that is visible within that shading pixel. In effect, each visible primitive is divided into one or more polygons that each represent such an intersection within a shading pixel.

Following the clipping, the attributes of the vertices of each visible primitive are interpolated to the vertices of each of the polygons into which that primitive has been divided to derive the attributes at the vertices of those polygons. Pixel shading is then performed at each of the vertices of each of the polygons to derive the color values for the vertices of each of the polygons.

Following the pixel shading at the vertices of the polygons, the color values at the vertices of the polygons are interpolated to derive the color values for the screen pixels. In some embodiments, which vertices are employed in interpolating color values to which screen pixels may be based on the location of the center of each screen pixel relative to boundaries of the polygons. Stated differently, where the center of particular screen pixel falls within the boundaries of a particular polygon, the color values at the vertices of that particular polygon are interpolated to derive the color value of that particular screen pixel. However, in other embodiments, the color values at the vertices of each polygon are interpolated to derive the color values of each sample of the screen image that falls within that polygon, and the color values of the samples that fall within each screen pixel are averaged to derive the color of that screen pixel. Regardless of whether the interpolation of color values from the vertices of the polygons are to the centers of the screen pixels, or are to the samples of the screen image followed by averaging, other attributes at the vertices of the polygons may also be so interpolated.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a graphics rendering system 1000 incorporating one or more of a source device 300, a computing device 500 and a viewing device 700. The computing device 500 generates a two-dimensional (2D) screen image 880 of a three-dimensional (3D) model 280 as projected onto a 2D plane of the screen image 880. The computing device 500 may receive 3D model data 330 representing the 3D model 280 of one or more objects within a defined 3D space from the source device 300. The 3D model data 330 may either directly specify the primitives making up the one or more objects of the model 280 and/or the attributes of those primitives, or may include enough information to enable derivation of those primitives and/or their attributes.

Following generation of the screen image 880, the computing device 500 may present the screen image 880 on the display 580 and/or transmit screen image data 730 representing the screen image 880 to the viewing device 700 to be presented on a display 780 thereof. The screen image data 730 may include a bitmap of the screen image 880 in which the colors of each pixel of the screen image 880 may be encoded in any of a variety of formats. In some embodiments, the pixel resolution of the screen image 880 may be selected to match the pixel resolution of the display 580 and/or of the display 780. Indeed, in some embodiments, the viewing device 700 may provide an indication of the pixel resolution of the display 780 to the computing device 500 to enable the pixel resolution of the screen image 880 to be set to match the pixel resolution of the display 780.

Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 300, 500 and 700 exchange signals conveying data representing a 3D model and/or a 2D screen image through a network 999. However, one or more of these computing devices may exchange other data entirely unrelated to rendering a 2D image from a 3D model with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 500 incorporates one or more of a processor component 550, a storage 560, a display 580, a controller 600 and an interface 590 to couple the computing device 500 to the network 999. The storage 560 stores one or more of a control routine 540, the 3D model data 330 and control data 335. The controller 600 incorporates one or more of a processor component 650 and a storage 660. The storage 660 stores one or more of a control routine 640, visible primitives data 632, polygon data 633, shaded polygon data 635, attributed polygon data 636, sample color data 637 and the screen image data 730.

The control routine 540 incorporates a sequence of instructions operative on the processor component 550 in its role as a main processor component of the computing device 500 to implement logic to perform various functions. In executing the control routine 540, the processor component 550 may receive the 3D model data 330 from the source device 300 via the network 999, and may store at least a portion thereof that represents at least a portion of the 3D model 280 in the storage 560. It should be noted that the 3D model data 330 may be stored in the storage 560 for a considerable amount of time before any use is made of it, including generating 2D images thereof or transmission. Following generation of the screen image data 730 representing the screen image 880, the processor component 550 may visually present the image 880 on the display 580 for viewing and/or transmit the screen image data 730 to the viewing device 700 to enable the screen image 880 to be presented on the display 780 for viewing.

In some embodiments, the processor component 550 may receive indications of various configuration parameters to employ in generating the screen image 880 from the 3D model 280. For example, in embodiments in which the screen image 880 is to be transmitted to the viewing device 700 for presentation on the display 780, indications may be received from the viewing device 700 (e.g., via the network 999) of the pixel resolution, color depth, frame rate and/or other parameters of the display 780. By way of another example, indications of location and/or orientation of the plane and/or boundaries of the screen image 880 relative to the 3D model 280 may be received from the viewing device 700 and/or from still another device (not shown) via the network 999. The processor component 550 may store indications of such parameters as part of the control data 335 for use by the processor component 650 in generating the screen image 880. Alternatively or additionally, the indication of pixel resolution may be of the display 580, rather than the display 780.

Figure 3:
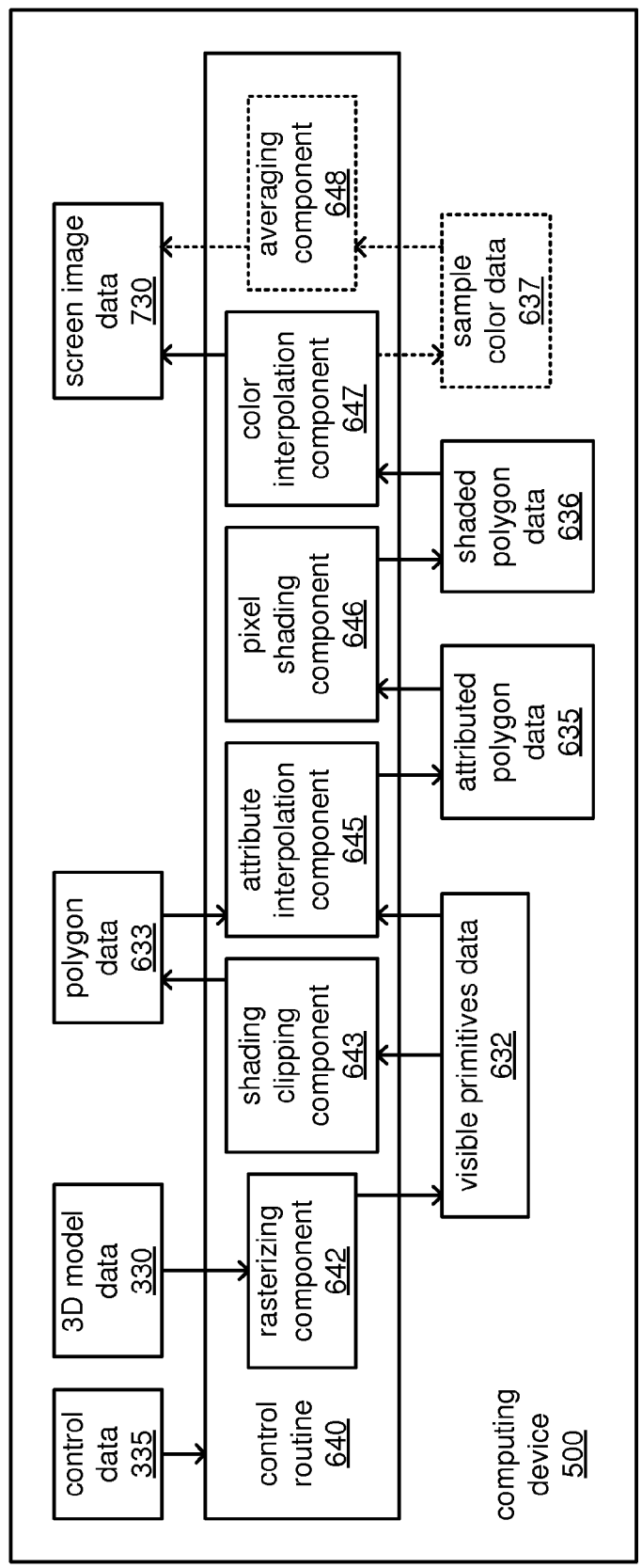
FIG. 3 illustrates a portion of an example embodiment.

The control routine 640 incorporates a sequence of instructions operative on the processor component 650 in its role as a controller processor component of the controller 600 of the computing device 500 to implement logic to perform various functions. In executing the evaluation routine 640, the processor component 650 generates the screen image data 730 representing the screen image 880 from the 3D model data 330 representing the 3D model 280. More precisely, the processor component 650 renders the screen image 880 as a 2D projection of the 3D model 280 onto the plane of the screen image 880. FIG. 3 depicts an example embodiment of such generation of the screen image data 730 representing the screen image 880 from the 3D model data 330 representing the 3D model 280. As depicted, the control routine 640 may incorporate one or more of a rasterizing component 642, a shading clipping component 643, an attributes interpolation component 645, pixel shading component 646, a color interpolation component 647 and averaging component 648. In executing the control routine 640, the processor component 650 may execute one or more of the components 642, 643, 645, 646, 647 and 648 of the control routine 640.

Figure 4:
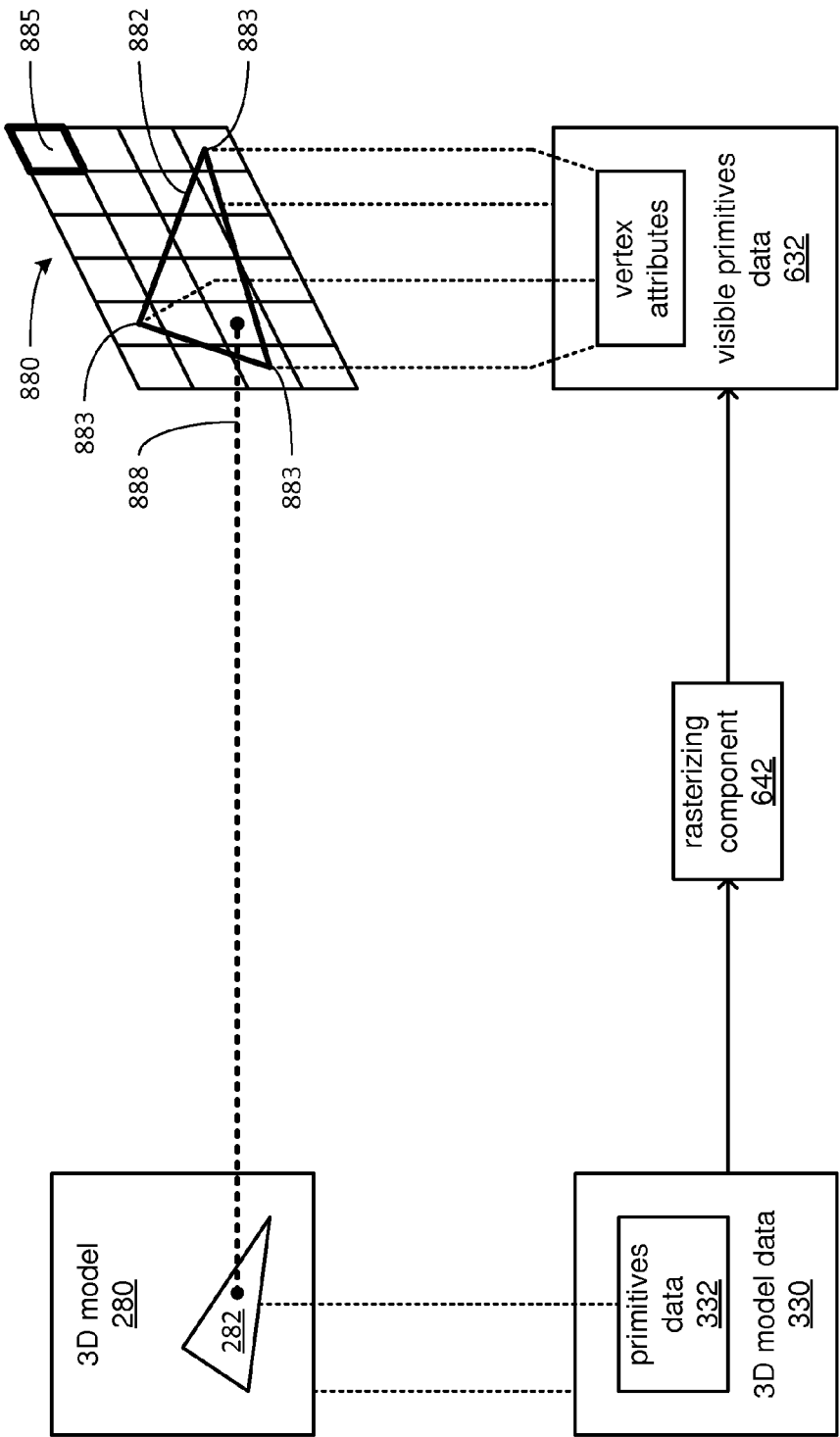
FIG. 4 illustrates an example embodiment of rasterization of a 3D model.

The rasterizing component 642 may retrieve an indication of the location and orientation of the plane of the screen image 880 relative to the one or more objects of the 3D model 280 and/or the boundaries of the screen image 880 within that plane, from the control data 335. The rasterizing component 642 may then employ that indication in rasterizing graphics primitives of the one or more objects of the 3D model 280 using multiple samples for each pixel of the screen image 880 to determine which of those primitives are the visible primitives that are at least partly visible in the screen image 880. FIG. 4 depicts aspects of an example of such rasterizing in greater detail. As depicted, the 3D model data 330 may incorporate primitives data 332 that includes indications of various characteristics of the primitives 282 of the 3D model 280, such as size, shape, location and/or orientation. As previously discussed, each primitive 282 may be any of a variety of types of polygon, each of which extends within a single plane. However, as also previously discussed, the majority of primitives (if not all) in typical 3D models are triangles.

In performing rasterization to determine which primitives 282 of the 3D model 280 are also visible primitives 882 that are at least partly visible in the screen image 880, the rasterizing component 642 may project numerous screen image samples 888 (only one of which is depicted for sake of visual clarity) for each screen image pixel 885 of the screen image 880 towards the 3D model 280. In so projecting the screen image samples 888, any of a variety of sampling techniques may be used in selecting the quantity of screen image samples 888 per screen image pixel 885, and in selecting the locations of the screen image samples 888 within the area covered by each screen image pixel 885. Such techniques include, and are not limited to, supersampling, multisampling and/or stochastic sampling. As each screen image sample 888 is projected (like a line extending from and normal to the plane of the screen image 880) towards the 3D model 280, the first primitive 282 of the 3D model 280 encountered by each screen image sample 888 becomes a visible primitive 882 that is at least partly visible in the screen image 880.

Indications of what visible primitives 882 are identified by the rasterization may be stored as part of the visible primitives data 632. As depicted, among the information concerning the visible primitives 882 that is so stored may be indications of various attributes associated with each of the vertices 883 of each of the visible primitives 882. The stored attributes may include, and are not limited to, one or more of positions of the vertices, normal vectors, specifications of materials, depths relative to the plane of the screen image 880, etc. In some embodiments, the visible primitives data 632 may be referred to as a "geometry buffer" (G-buffer).

Figure 5:
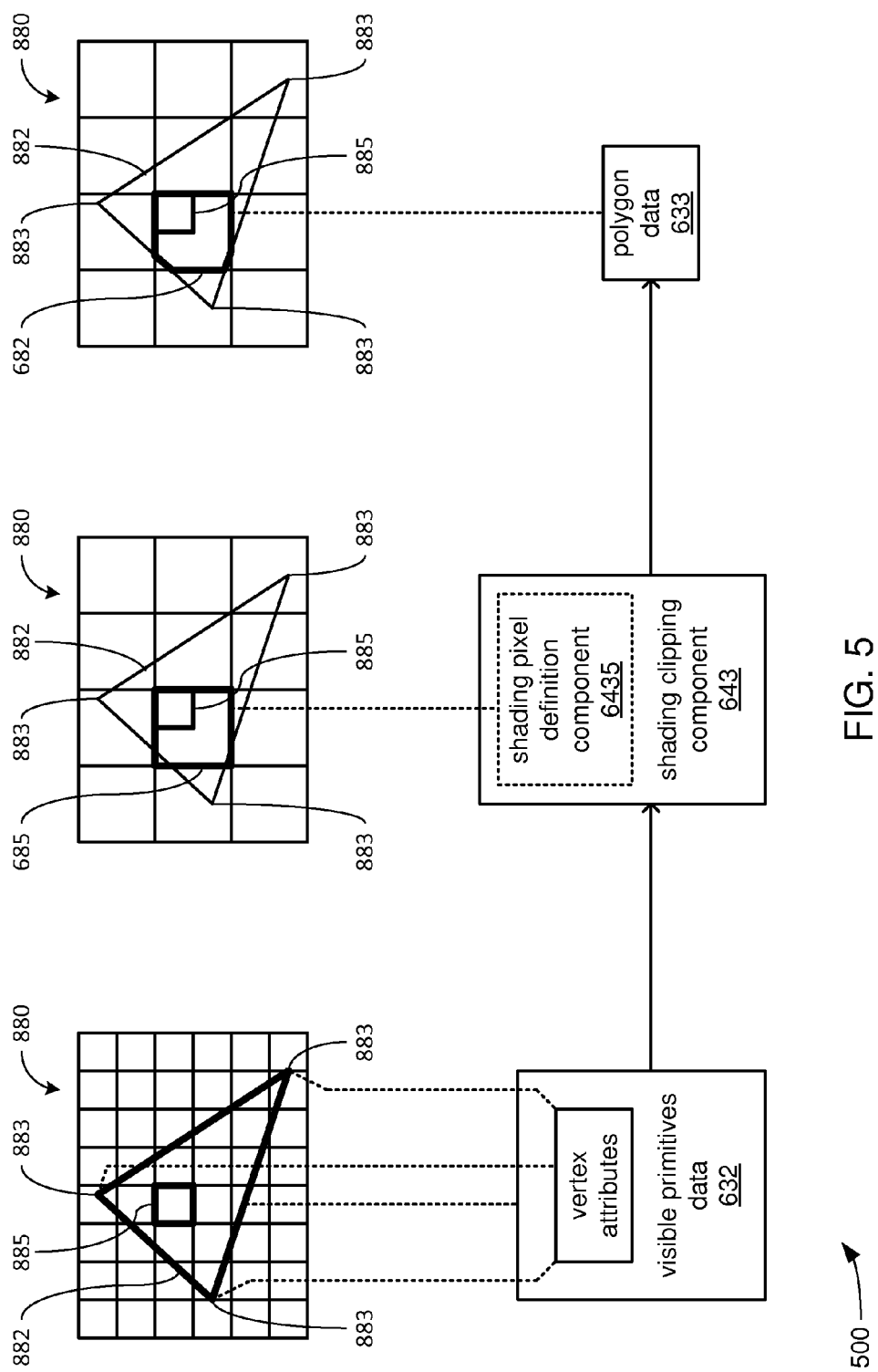
FIG. 5 illustrates an example embodiment of clipping to define a polygon.

Returning to FIG. 3, following the rasterization performed by the rasterizing component 642, the shading clipping component 643 may divide each of the visible primitives 882 into one or more polygons that each represent an intersection of a visible primitive 882 with a shading pixel to derive vertices for use in subsequent pixel shading. FIG. 5 depicts aspects of such division of an example visible primitive 882 in greater detail. More specifically, superimposed onto the grid of screen pixels 885 employed during rasterization is a coarser grid of shading pixels 685 to be employed during subsequent pixel shading. As depicted, each of the shading pixels 685 may cover a larger area than the screen pixels 885. Also, the boundaries of the shading pixels 685 may align with at least a subset of the boundaries of the screen pixels 885 such that the area covered by one of the shading pixels 685 overlaps the area covered by an integer multiple of the screen pixels 885 (e.g., each shading pixel 685 corresponding to and covering the area of four of the screen pixels 885, as depicted). Despite such a depiction of a particular manner of correspondence in location and area between the shading pixels 685 and the screen pixels 885, it should be noted that other embodiments are possible in which the boundaries do not align and/or in which the area covered by a shading pixel 685 is not an integer multiple of the area covered by a screen pixel 885.

In some embodiments, the manner in which the boundaries and/or areas covered by the pixels 685 and 885 correspond may be determined by an indication stored within the configuration data 335 (for example, an indication dictating that each shading pixel 685 covers the area of four of the screen pixels 885, as depicted), and that indication may be retrieved from the configuration data 335 by the shading clipping component 643. In other embodiments, the shading clipping component 643 may include a shading pixel definition component 6435 to determine the boundaries and/or areas covered by the shading pixels 685 based on an analysis of one or more characteristics of the visible primitives 882 (e.g., based on a statistics such as the average area covered by the visible primitives 882).

Regardless of the manner in which the size and/or boundaries of the shading pixels 685 relative to the screen pixels 885 are determined, the shading clipping component 643 may perform clipping of portions of visible primitives 882 that fall within each of the shading pixels 685 to derive polygons 682 that each represent the intersection of the area covered by a shading pixel 685 and a portion of a visible primitive 882 that falls within that shading pixel 685. More specifically, and as depicted, an example visible primitive 882 earlier identified by the rasterizing component 642 is overlain with a grid of shading pixels 685, including an example shading pixel 685 (highlighted) that corresponds to an example screen pixel 885 (also highlighted) for which a color value is sought. Within the example shading pixel 685, clipping of the example visible primitive 882 is performed in the vicinity of two of the corners of the example shading pixel 685 to define an example polygon 682 (also highlighted) having a shape that is defined by the intersection of the areas covered by the example shading pixel 685 and the portion of the example visible primitive 882 that falls within the example shading pixel 685.

In some embodiments, the shading clipping component 643 may generate a barycentric coordinate system on each visible primitive 882 to control the clipping. As familiar to those skilled in the art, a barycentric coordinate system is based on the relative locations of vertices, centers of each segment extending between vertices and/or center of mass of a polygon. Further, within at least convex polygons, a barycentric coordinate system defines all points with entirely non-negative coordinate values as being either at an edge of or within a polygon, and all points with any negative coordinate value as being outside the polygon. Thus, in embodiments in which the shading clipping component 643 generates a barycentric coordinate system for each visible primitive 882, the shading clipping component 643 may then impose a limitation against any negative coordinate value as part of identifying the locations of edges of a visible primitive 882 within a shading pixel 685 to determine where clipping should take place within that shading pixel 685.

Regardless of the manner in which determinations are made of where to perform clipping to generate each polygon 682, the shading clipping component 643 may store indications of the areas covered by each polygon 682 that may be defined by such clipping within each of the shading pixels 685 as part of the polygon data 633. In some embodiments, the geometries of each such polygon 682 may be described within the polygon data 633 by indications of the locations of their vertices.

Figure 6:
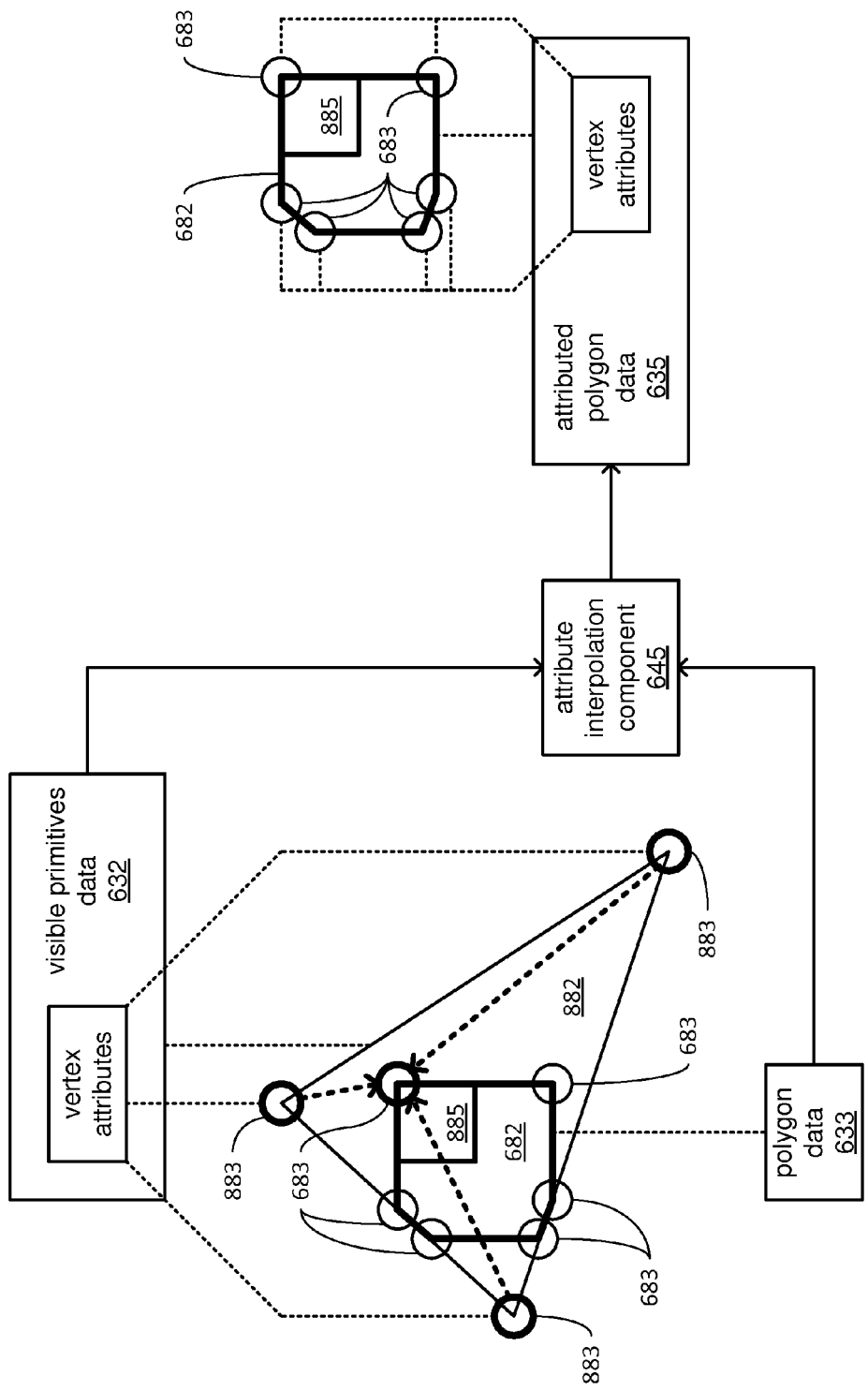
FIG. 6 illustrates an example embodiment of interpolation to derive attributes of vertices of a polygon.

Returning to FIG. 3, following the clipping performed by the clipping component 643, the attribute interpolation component 645 may interpolate one or more attributes at the vertices of each visible primitive 882 to the vertices of the polygons 682 into which the visible primitives 882 have been divided as a result of the clipping. FIG. 6 depicts aspects of an example of such interpolation of attributes from the vertices of the example primitive 882 to the vertices of the example polygon 682 of FIG. 5 in greater detail. Turning more specifically to what is depicted in FIG. 6, the attribute interpolation component 645 interpolates one or more attributes of each of the vertices 883 of the example visible primitive 882 to each of the vertices 683 of the example polygon 682. In so doing, the attribute interpolation component 645 may retrieve indications of the attributes of the vertices 883 of the example visible primitive 882 from the visible primitives data 632 and may retrieve indications of the locations of the vertices 682 of the example polygon 682 from the polygon data 633.

The performance of interpolation by the attribute interpolation component 645 from one or more attributes at each of the vertices 883 of the example visible primitive 882 to the vertices 683 of the example polygon 682 avoids instances of extrapolation in which interpolation from the vertices 883 is made to one or more locations outside the example visible primitive 882. Interpolating attributes from each of the vertices of a primitive to a location outside that primitive may be deemed logically incoherent, since there may be no basis for the inherent assumption that attributes of that primitive would have any applicability to what may be a location at which nothing may exist or at which another primitive having entirely different attributes may exist. By way of example, interpolating from color values at the vertices 883 of the example visible primitive 882 to a location outside the example visible primitive 882 is likely to be meaningless, since there may be nothing at that location to be given a color value or there may be a different primitive with entirely different color at that location.

The vertices 683 of the example polygon 682 provide a set of locations that are known to be either within the example visible primitive 882 or along one or more of the edges of the example visible primitive 882, rather than outside of the example visible primitive 882. As a result, the interpolations by the attribute interpolation component 645 are able to be performed from the vertices 883 of the example visible primitive 882 to each of the vertices 683 of the example polygon 682 without the risk of one or more of those interpolations being an extrapolation. This contrasts with other known techniques in which such interpolation would be performed from the vertices 883 of the example visible primitive 882 to either the corners of the shading pixel 685 in which the example polygon 682 is formed or to the centers of that shading pixel 685 and one or more neighboring shading pixels 685. Such interpolations of those other known techniques would each result in multiple extrapolations (as can be seen by referring to FIG. 5). The attribute interpolation component 645 may store indications of the attributes derived for each of the vertices 683 of the example polygon 682 as part of the attributed polygon data 635. In some embodiments, the attributed polygon data 635 may also include indications of the locations of each of the vertices 683.

Returning to FIG. 3, following the interpolation to derive attributes at the vertices 683 of each of the polygons 682 performed by the attribute interpolation component 645, the pixel shading component 646 may employ the attributes at each vertex 683 of each polygon 682 as inputs to performing pixel shading at each vertex 683 of each polygon 682 to derive color values for each vertex 683 of each polygon 682. For example, at each vertex 683 of the example polygon 682, the pixel shading component 646 may employ one or more attributes at that vertex 683 to derive a color value specifying a color at that vertex 683. In so doing, the pixel shading component 646 may retrieve indications of the one or more attributes for each vertex 683 of the example polygon 682 from the attributed polygon data 635. The pixel shading component 646 may then store indications of the color values specifying a color at each of the vertices 683 of the example polygon 682 as part of the shaded polygon data 636. In some embodiments, the shaded polygon data 636 may also include indications of the locations of each of the vertices 683 and/or attributes at each of the vertices 683.

Figure 7:
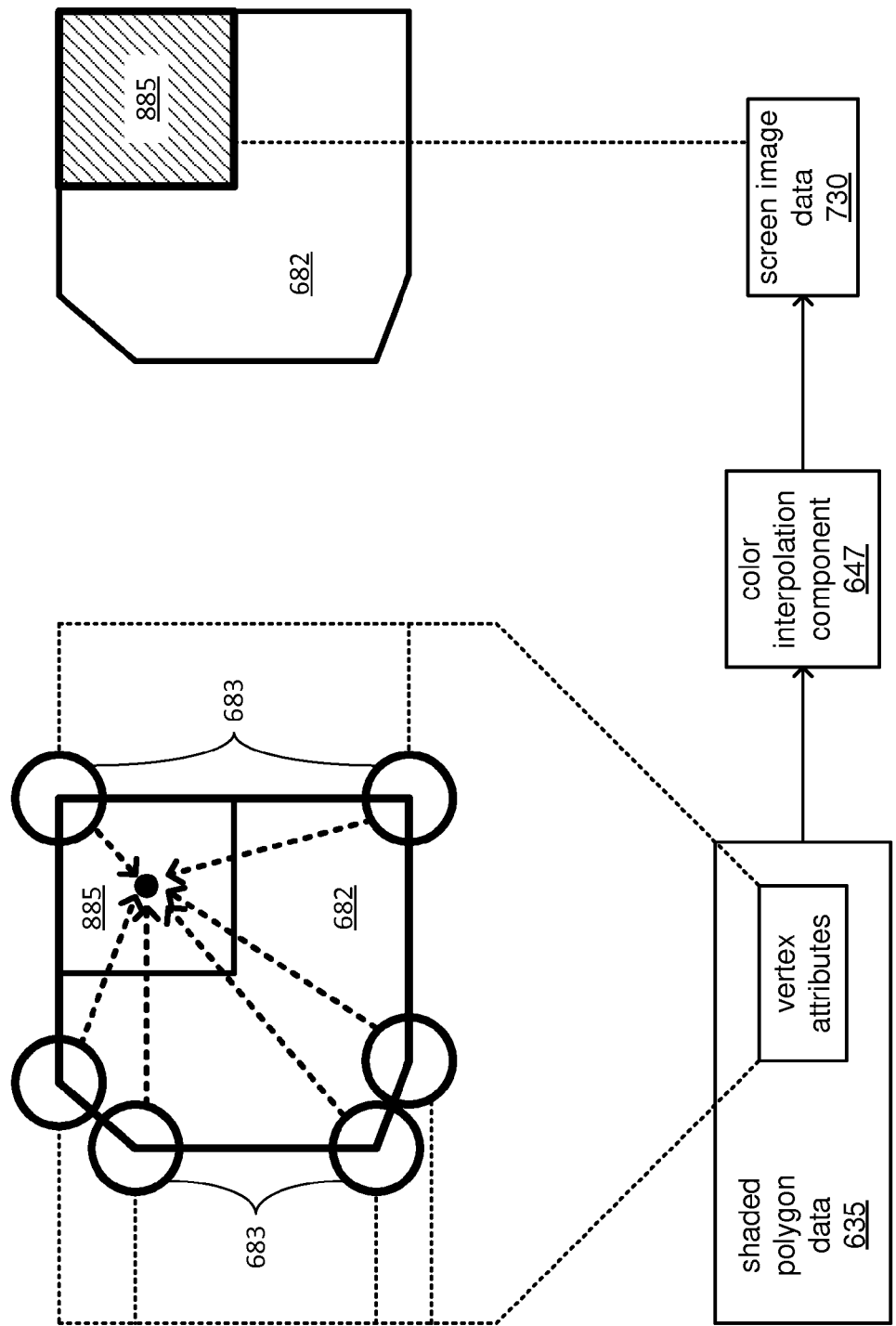
FIG. 7 illustrates an example embodiment of pixel shading vertices of a polygon.

Following the shading at the vertices 683 of each of the polygons 682 performed by the pixel shading component 646, the color interpolation component 647 may interpolate color values at each vertex of each polygon 682 to derive the color values of the screen pixels 885. FIG. 7 depicts aspects of an example of such interpolation to derive the color value of the example screen pixel 885 coinciding with the example polygon 682 of FIGS. 5 and 6 in greater detail.

It should be noted that the interpolation performed by the color interpolation component 647 includes at least interpolating a color value specifying a color for each screen pixel 885 of the screen image 880 from the color values derived by the pixel shading component 646 for the vertices 683 of corresponding ones of the polygons 682. However, the interpolation performed by the color interpolation component 647 may also include deriving one or more other attributes for each screen pixel 885 by similarly interpolating those attributes derived for the vertices 683 of corresponding ones of the polygons 682 by the attribute interpolation component 645. In so doing, the color interpolation component 647 may retrieve indications of color values and/or values of attribute(s) at each of the vertices 683 of the polygons 682 from the shaded polygon data 636. The color interpolation component 647 may then store color values and/or values of attribute(s) derived for the screen pixels 885 by interpolation as part of the screen image data 730. With the value(s) of each screen image pixel 885 stored in the screen image data 730, the screen image data 730 may become a representation of the screen image 880.

Thus, the color interpolation component 647 may interpolate color values derived for each of the vertices 683 of the example polygon 682 by the pixel shading component 646 to derive a color value specifying a color for the example screen pixel 885. Similarly, the color interpolation component 647 may additionally interpolate values of one or more other attributes derived for each of the vertices 683 of the example polygon 682 by the pixel shading component 646 to derive value(s) for those one or more other attributes for the example screen pixel 885. The location at which these interpolations performed by the color interpolation component 647 may be directed may be the center of the example screen pixel 885. Further, the example screen pixel 885 may be deemed to correspond to the example polygon 682 as a result of the center of the example screen pixel 885 falling within the example polygon 682, and this form of correspondence to the example polygon 682 may determine that the attributes (including a color value) derived for the example screen pixel 885 are to be interpolated from the vertices 683 of the example polygon 682.

Figure 8:
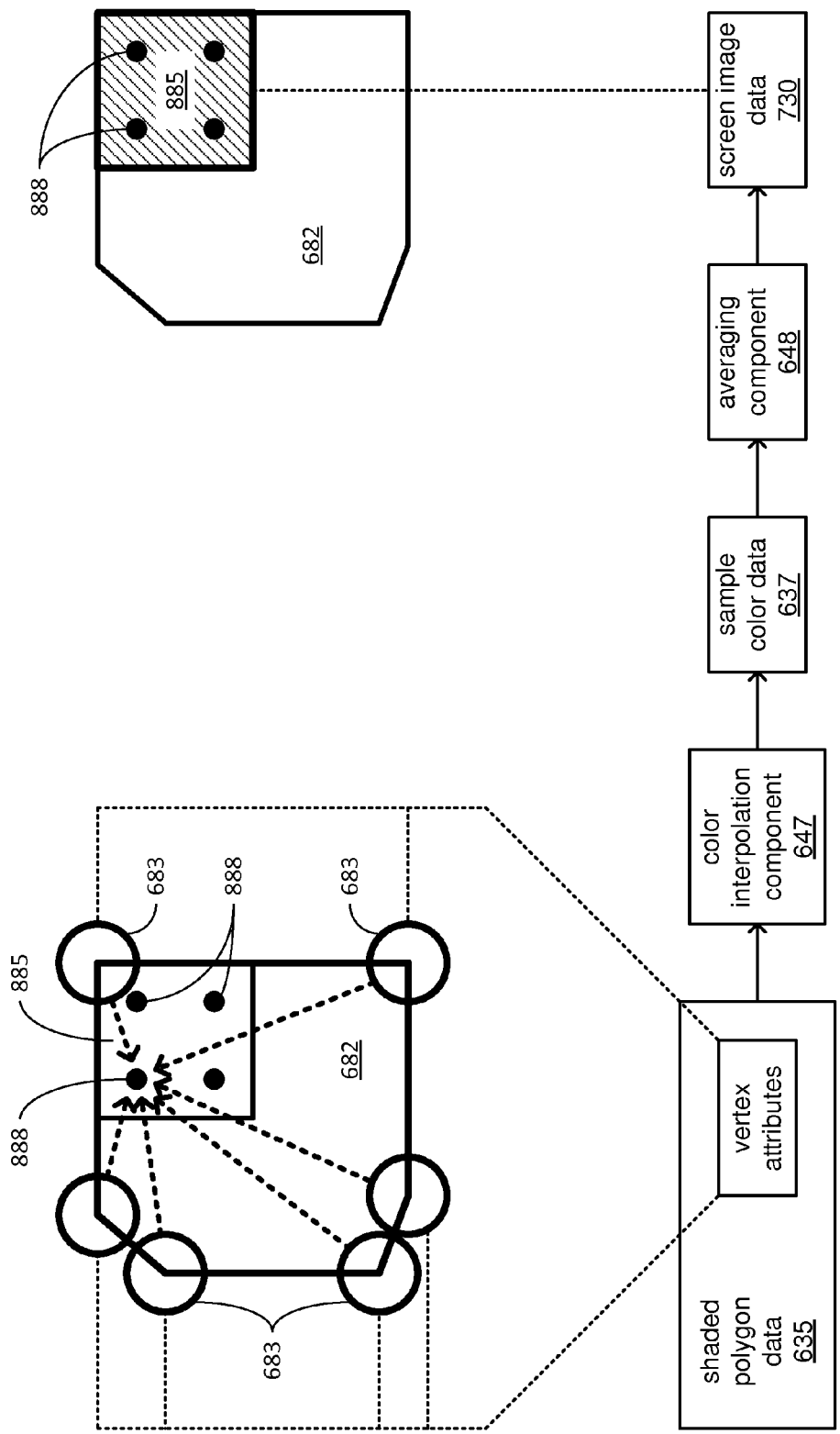
FIG. 8 illustrates an example embodiment of interpolation to color a screen pixel.

Such interpolation to the center of each of the screen pixels 885, as just described, from the vertices 683 of the polygons 682 by the color interpolation component 647 may be performed in embodiments in which there is a single sample per screen pixel 885 (or in embodiments in which the derivation of color values for each screen pixel 885 is not to be based on the quantity of samples per pixel, regardless of how many samples there may be per pixel). However, in embodiments in which multiple samples per screen pixel 885 were employed during rasterization, the color interpolation component 647 may interpolate from the vertices 683 of the polygons to each of those samples. FIG. 8 depicts an example of such interpolation to each sample of each screen pixel 885 in greater detail.

Specifically, as depicted, there may be four samples 888 that fall within the example screen pixel 885 such that the color interpolation component 647 may interpolate color values and/or values of other attributes at the vertices 683 of the example polygon 682 to each of the samples 888 of the example screen pixel 885. In so doing, the color interpolation component 647 may store indications of those values so derived for each sample 888 as part of the sample color data 637. Then, the averaging component 648 may average the color values just derived by interpolation for each of the samples 888 of the example screen pixel 885 to derive a color value of the example screen pixel 885. The averaging component 648 may additionally average values of one or more other attributes also just derived by interpolation for each of the samples 888 of the example screen pixel 885 to derive value(s) of one or more other attributes of the example screen pixel 885. In so doing, the averaging component 648 may store the color value and/or the value(s) of one or more other attributes of the example screen pixel 885 as part of the screen image data 730.

Figure 9B:
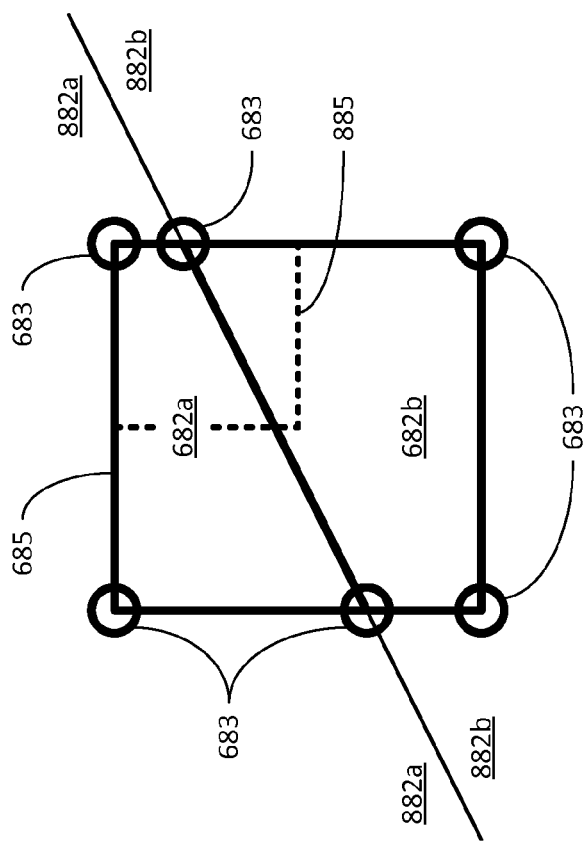
FIGS. 9A and 9B, together, illustrate an example embodiment of clipping to define more than one polygon.
Figure 9A:
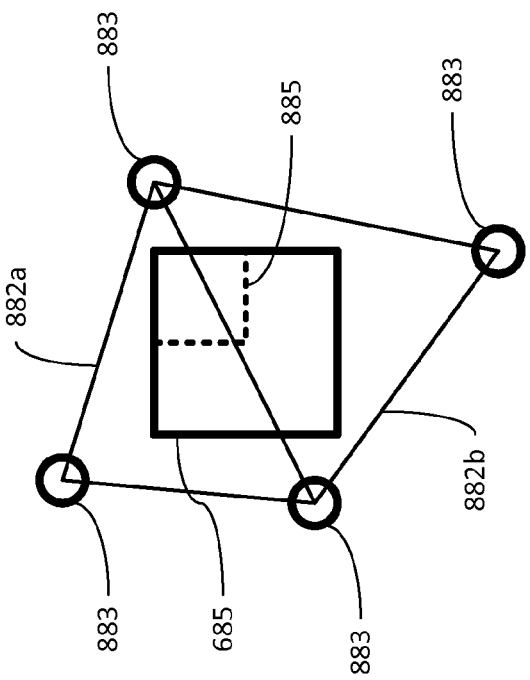

It should be noted that the depiction of the formation and use of the single example polygon 682 of FIGS. 5-8 is meant to be a relatively simple example presented herein to enable clear discussion of the derivation of at least color values for the screen pixels 885 from the 3D model 280 as part of rendering the 2D screen image 880. However, as recognizable to those skilled in the art, it may be quite common to have portions of more than one visible primitive 882 within at least some of the shading pixels 685 such that more than one polygon 682 would be formed within each of those shading pixels 685. FIGS. 9A and 9B, together, depict aspects of the formation of a pair of adjacent polygons 682*a* and 682*b* within an alternate example shading pixel 685 as a result of portions of a pair of adjacent visible primitives 882*a* and 882*b* falling within the alternate example shading pixel 685.

Turning more specifically to FIG. 9A, as depicted, the two adjacent visible primitives 882*a* and 882*b* meet in a manner forming a common edge with common vertices 883 that extends through the alternate example shading pixel 685 and through an alternate example screen pixel 885 that coincides with a portion of the alternate example shading pixel 685. Also depicted are the relative locations of the vertices 883 of each of the adjacent visible primitives 882*a* and 882*b*, including two vertices 883 that are shared therebetween.

Turning more specifically to FIG. 9B, the shading clipping component 643 performs clipping of each of the adjacent visible primitives 882*a* and 882*b* within the alternate example shading pixel 685 to form the pair of adjacent polygons 682*a* and 682*b* therein. As depicted, the adjacent polygons 682*a* and 682*b* share a portion of the common edge between the adjacent visible primitives 882*a* and 882*b* as the common edge between the adjacent polygons 682*a* and 682*b*. Also depicted are the relative locations of the vertices 683 of each of the adjacent polygons 682*a* and 682*b*, including two vertices 683 that are shared therebetween. The two shared vertices 683 are defined along the boundaries of the alternate example shading pixel 685 as a result of the clipping performed by the shading clipping component 643.

In embodiments in which the adjacent visible primitives 882a and 882b are part of a set of visible primitives that define portions of the same surface of the same object, the color values derived for the vertices 683 of each of the adjacent polygons 682a and 682b that share a common location along the boundaries of the alternate example shading pixel 685 are likely to be substantially similar. As a result, a smooth transition may be perceived as occurring between the portions of that surface defined by the adjacent visible primitives 882a and 882b. Indeed, FIG. 9B illustrates that the division of visible primitives into one or more polygons as described herein is likely to bring about the formation of polygon vertices associated with adjacent visible primitives that will share common locations, which in turn is likely to result in such similar color values among adjacent visible primitives.

Returning to FIG. 1, following generation of the screen image data 730 representing the screen image 880, as has been described, the processing component 550 may present the image 880 on the display 580. Alternatively or additionally, the processor component 550 may operate the interface 590 to transmit the screen image data 730 to another device, such as the viewing device 700, to enable the presentation of the image 880 on another display, such as the display 780.

In various embodiments, the viewing device 700 incorporates one or more of a processor component 750, a storage 760, a display 780 and an interface 790 to couple the viewing device 700 to the network 999. The storage 760 stores one or more of a control routine 740 and the screen image data 730. The control routine 740 incorporates a sequence of instructions operative on the processor component 750 in its role as a main processor component of the viewing device 700 to implement logic to perform various functions. In executing the control routine 740 in some embodiments, the processor component 750 may operate the interface 790 to transmit an indication of the pixel resolution of the display 780 to the computing device 500. As previously discussed, such an indication may be stored within the computing device 500 as part of the control data 335, and later employed to one or more aspects of rendering the screen image 880 (e.g., setting the pixel resolution of the screen image 800). Alternatively or additionally, the processor component 750 may operate the interface 790 to receive the screen image data 730 representing the screen image 880 from the computing device 500 after the computing device 500 has rendered the screen image 880, as has been described. The processor component 750 may then visually present the motion screen image 880 on the display 780.

Figure 2:
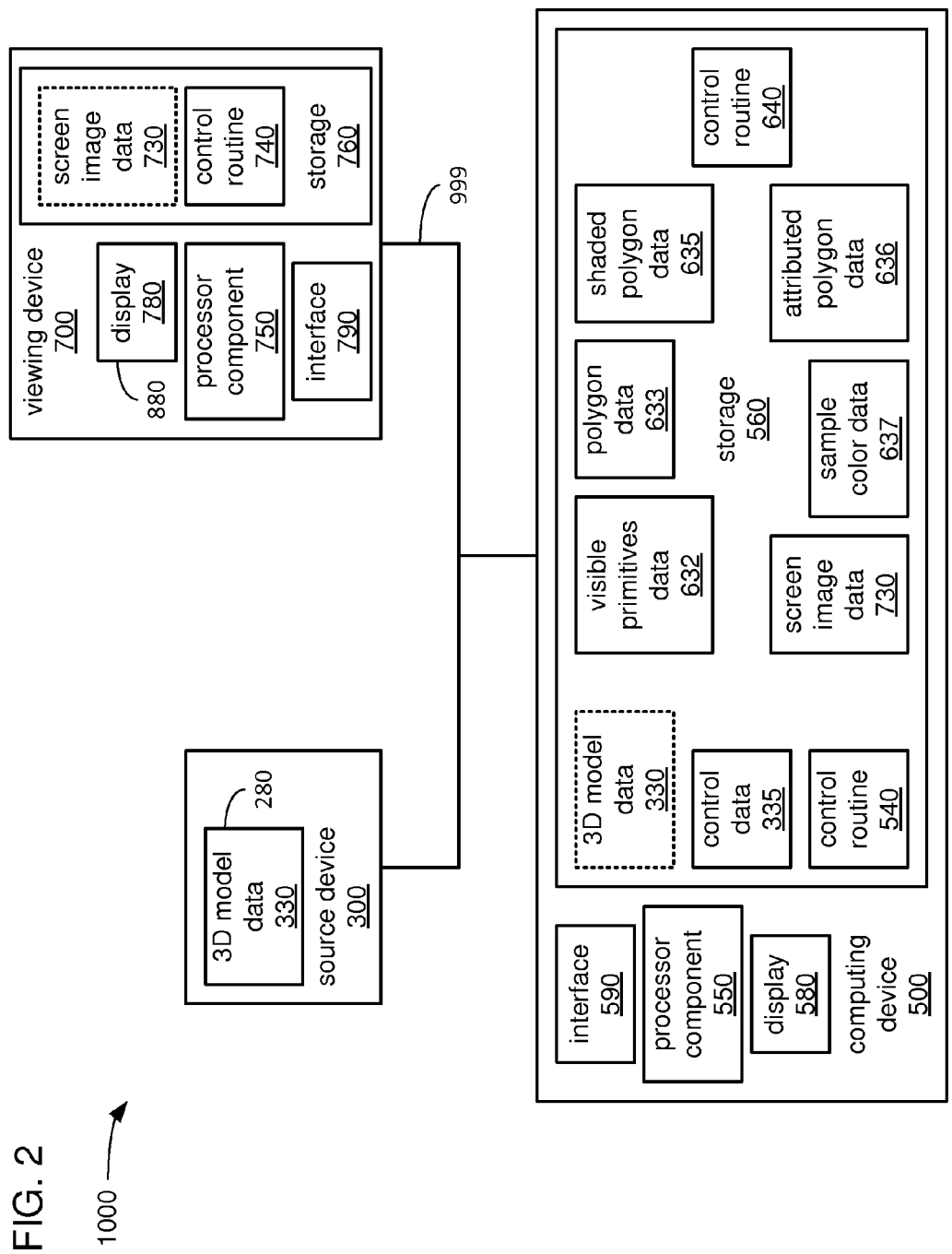
FIG. 2 illustrates an alternate example embodiment of a graphics rendering system.

FIG. 2 illustrates a block diagram of an alternate embodiment of the graphics rendering system 1000 that includes an alternate embodiment of the computing device 500. The alternate embodiment of the graphics rendering system 1000 of FIG. 2 is similar to the embodiment of FIG. 1 in many ways, and thus, like reference numerals are used to refer to like elements throughout. However, unlike the computing device 500 of FIG. 1, the computing device 500 of FIG. 2 does not incorporate the controller 600. Thus, unlike the computing device 500 of FIG. 1, in the computing device 500 of FIG. 2, the processor component 550 executes the control routine 640 in lieu of there being a separate processor component 650 to do so. Therefore, in the alternate embodiment of the graphics rendering system 1000 of FIG. 2, the processor component 550 performs the rendering of the screen image 880, including the rasterizing, shading and filtering in a manner not unlike what has been described with regard to execution of the control routine 640 by the processor component 650.

In various embodiments, each of the processor components 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked. Also, although each of the processor components 550 and 650 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image rescaling, etc., using components separate and distinct from the processor component 650 and its more closely related components.

In various embodiments, each of the storages 560, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor components 550 and/or 650 in executing at least the control routine 640, and/or performed by other component(s) of the computing device 500.

At 2110, a processor component of a computing device (e.g., the processor component 550 and/or 650 of the computing device 500) performs rasterization of all graphics primitives of a 3D model (e.g., the primitives 282 of the 3D model 280) from the perspective of a plane of a 2D screen image (e.g., the screen image 880) to be rendered from the 3D model. In so doing, the processor component identifies all of the primitives of the 3D model that are visible from the perspective of the 2D screen image (e.g., the visible primitives 882), and obtains various attributes associated with the vertices of each of those visible primitives. As has been discussed, the location and/or orientation of such a plane, as well as the boundaries of the screen image within that plane, may be received from another computing device (e.g., the viewing device 700).

At 2120, the processor component performs clipping of the visible primitives within each of shading pixels into which at least a portion of a visible primitive falls to derive polygons that each represent an intersection of the areas of the shading pixels and of the portions of the visible primitives that fall within the shading pixels. As previously discussed, the shading pixels may each be defined to include a greater area than each of the screen pixels that make up the 2D screen image such that the grid of shading pixels may be coarser than the grid of screen pixels. As also previously discussed, the shading pixels may be defined with boundaries that align with at least a subset of the boundaries of the screen pixels such that each shading pixel may be defined to corresponding with an integer multiple of the screen pixels (e.g., each shading pixel corresponding to four screen pixels, as has been depicted herein).

At 2130, the processor component performs pixel shading to derive color values at the vertices of the polygons from attributes interpolated to the vertices of the polygons from the vertices of associated ones of the visible primitives. At 2140, the processor component may interpolate color values from the vertices of the polygons to the centers of the screen pixels to derive color values of the screen pixels. As previously discussed, the location of the centers of each of the screen pixels relative to the polygons may be employed to determine which polygon's vertices are employed to provide the color values that are interpolated from.

Figure 11:
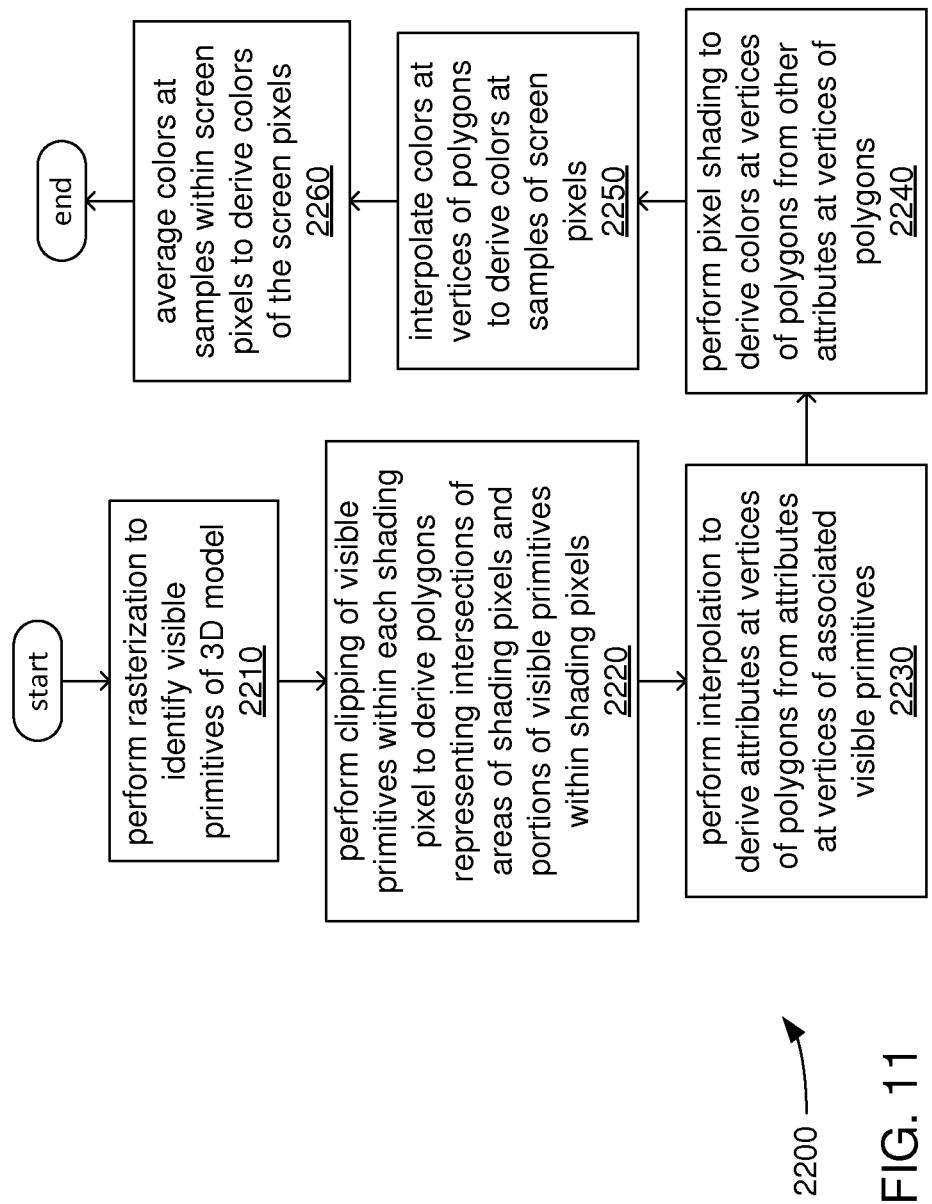

FIG. 11 illustrates one embodiment of a logic flow 2200. The logic flow 2200 may be representative of some or all of the operations executed by one or more embodiments described herein. More specifically, the logic flow 2200 may illustrate operations performed by the processor components 550 and/or 650 in executing at least the control routine 640, and/or performed by other component(s) of the computing device 500.

At 2210, a processor component of a computing device (e.g., the processor component 550 and/or 650 of the computing device 500) performs rasterization of all graphics primitives of a 3D model (e.g., the primitives 282 of the 3D model 280) from the perspective of a plane of a 2D screen image (e.g., the screen image 880) to be rendered from the 3D model to identify all of the primitives of the 3D model that are visible from the perspective of the 2D screen image (e.g., the visible primitives 882). As has been discussed, the location and/or orientation of such a plane, as well as the boundaries of the screen image within that plane, may be received from another computing device (e.g., the viewing device 700).

At 2220, the processor component performs clipping of the visible primitives within each of shading pixel into which at least a portion of a visible primitive falls to derive polygons that each represent an intersection of the areas of the shading pixels and of the portions of the visible primitives that fall within the shading pixels. As previously discussed, the shading pixels may each be defined to include a greater area than each of the screen pixels that make up the 2D screen image such that the grid of shading pixels may be coarser than the grid of screen pixels. As also previously discussed, the shading pixels may be defined with boundaries that align with at least a subset of the boundaries of the screen pixels such that each shading pixel may be defined to corresponding with an integer multiple of the screen pixels (e.g., each shading pixel corresponding to four screen pixels, as has been depicted herein).

At 2230, the processor component performs interpolation to derive attributes at the vertices of the polygons by interpolating from attributes at the vertices of associated ones of the visible primitives. At 2240, the processor component performs pixel shading to derive color values at the vertices of the polygons from the attributes at the vertices of the polygons.

At 2250, the processor component may interpolate at least color values from the vertices of the polygons to samples that fall within each of the polygons. At 2260, the processor component averages at least the color values at the samples that fall within each screen pixel to derive the color values of the screen pixels. As has been explained, values of other attributes may also be interpolated from the vertices of the polygons to the samples, and then averaged from the samples to derive values of those attributes for each screen pixel.

Figure 12:
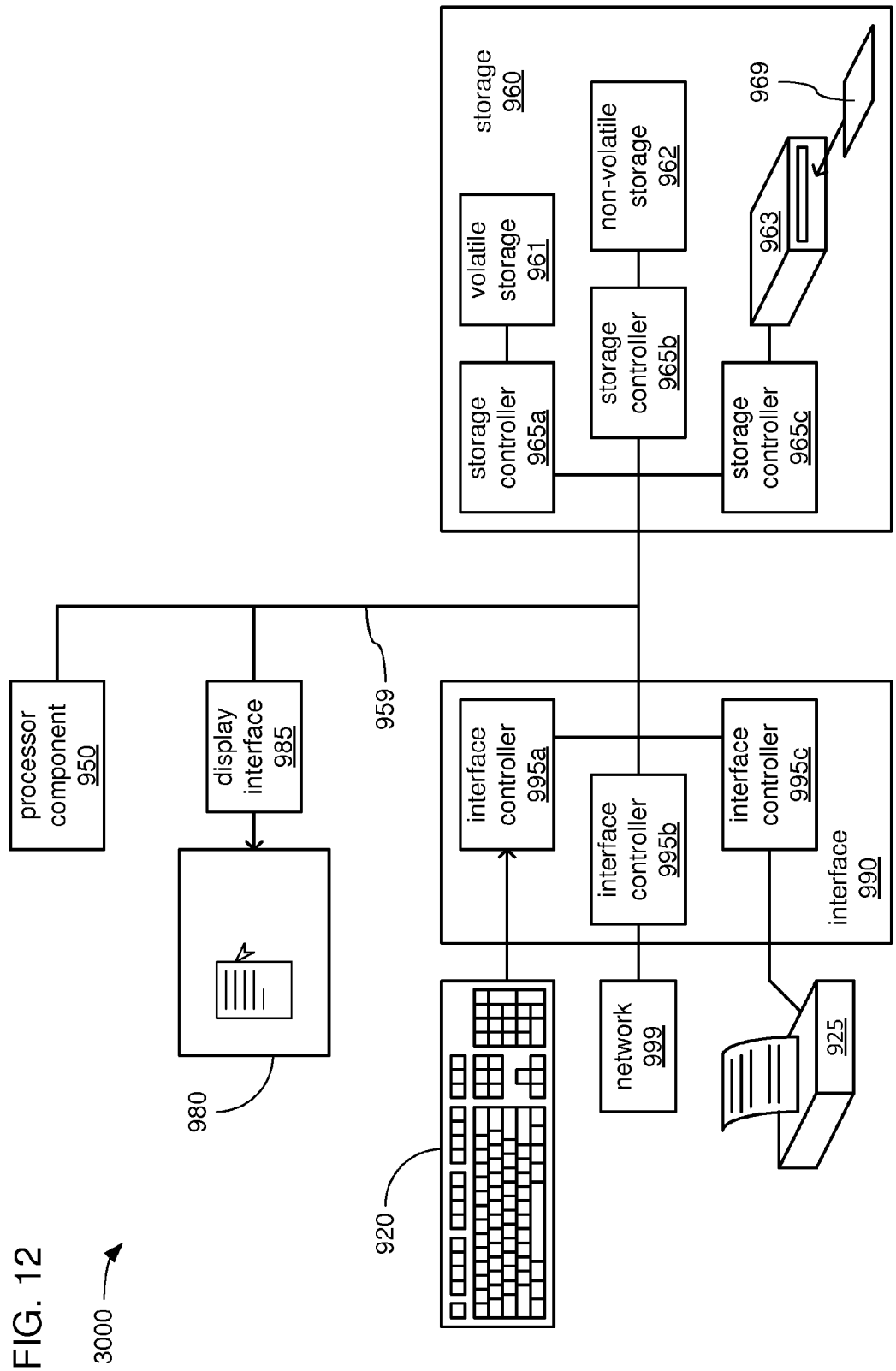
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550, 650 and 750) may include any of a wide variety of commercially available processors, employing any of a wide variety of technologies and implemented with one or more cores physically combined in any of a number of ways.

As previously discussed, the storage 960 (corresponding to the storages 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

FIG. 13 illustrates an embodiment of a system 4000. In various embodiments, system 4000 may be representative of a system or architecture suitable for use with one or more embodiments described herein, such as the graphics rendering system 1000; one or more of the computing devices 300, 500 or 700; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 550, 650 or 750, and/or to processor component 950 of FIG. 12.

Memory unit 4969 may be implemented using any machine-readable or computer-readable media capable of storing data, and may be the same as or similar to storage media 969 of FIG. 12.

Transceiver 4995 may include one or more radios capable of transmitting and receiving signals using various suitable wireless communications techniques, and may be the same as or similar to transceiver 995*b* in FIG. 12.

Display 4980 may include any television type monitor or display, and may be the same as or similar to one or more of displays 580 and 780, and/or to display 980 in FIG. 12.

Storage 4962 may be implemented as a non-volatile storage device, and may be the same as or similar to non-volatile storage 962 in FIG. 12.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900*b* may be hosted by any national, international and/or independent service and thus accessible to platform 4900*a* via the Internet, for example. Content services device(s) 4900*b* may be coupled to platform 4900*a* and/or to display 4980. Platform 4900*a* and/or content services device(s) 4900*b* may be coupled to a network 4999 to communicate (e.g., send and/or receive) media information to and from network 4999. Content delivery device(s) 4900*c* also may be coupled to platform 4900*a* and/or to display 4980.

In embodiments, content services device(s) 4900*b* may include a cable television box, personal computer, network, telephone, Internet enabled devices or appliance capable of delivering digital information and/or content, and any other similar device capable of unidirectionally or bidirectionally communicating content between content providers and platform 4900*a* and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900*b* receives content such as cable television programming including media information, digital information, and/or other content. Examples of content providers may include any cable or satellite television or radio or Internet content providers. The provided examples are not meant to limit embodiments.

In embodiments, platform 4900*a* may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900*a* and/or display 4980. Embodiments, however, are not limited to the elements or in the context shown or described herein.

In embodiments, drivers (not shown) may include technology to enable users to instantly turn on and off platform 4900*a* like a television with the touch of a button after initial boot-up, when enabled, for example. Program logic may allow platform 4900*a* to stream content to media adaptors or other content services device(s) 4900*b* or content delivery device(s) 4900*c* when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900*a* and content services device(s) 4900*b* may be integrated, or platform 4900*a* and content delivery device(s) 4900*c* may be integrated, or platform 4900*a*, content services device(s) 4900*b*, and content delivery device(s) 4900*c* may be integrated, for example. In various embodiments, platform 4900*a* and display 4890 may be an integrated unit. Display 4980 and content service device(s) 4900*b* may be integrated, or display 4980 and content delivery device(s) 4900*c* may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
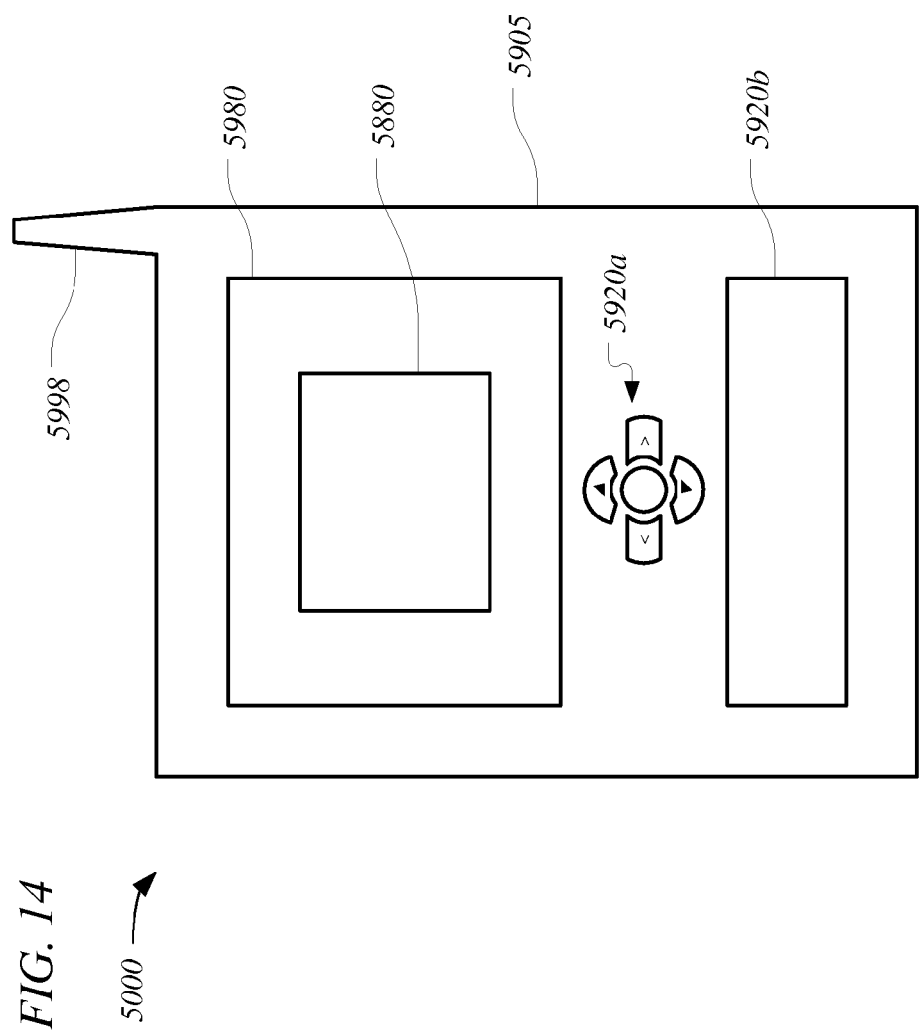
FIG. 14 illustrates an embodiment of a device.

As described above, system 4000 may be embodied in varying physical styles or form factors. FIG. 14 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 13. Navigation controller 5920a may include one or more navigation features which may be used to interact with user interface 5880, and may be the same as or similar to navigation controller 4920 in FIG. 13. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to render 2D imagery from 3D model data includes a clipping component to clip a first visible primitive of a 2D screen image derived from of a 3D model within a first area of the screen image covered by a shading pixel to form a first polygon representing an intersection of the first area and the first visible primitive; a first interpolation component to interpolate at least one attribute of vertices of the first visible primitive to each vertex of the first polygon; and a second interpolation component to interpolate color values of the vertices of the first polygon to a point within a second area covered by a screen pixel of the screen image, the second area smaller than the first area and at least partly coinciding with the first area.

In Example 2, which includes the subject matter of Example 1, the device may include a pixel definition component to determine a size of the first area based on a characteristic of a multitude of visible primitives of the 2D screen image, the multitude of visible primitives including the first visible primitive.

In Example 3, which includes the subject matter of any of Examples 1-2, the point may be located at a center of the screen pixel, and the shading component to select the vertices of the first polygon from which to interpolate the at least one attribute from among vertices of a multitude of polygons formed by the clipping component based on the location of the point relative to boundaries of each polygon of the multitude of polygons, the multitude of polygons including the first polygon.

In Example 4, which includes the subject matter of any of Examples 1-3, the point may coincide with a location of a sample falling within the screen pixel, the sample employed in rasterization of the first visible primitive.

In Example 5, which includes the subject matter of any of Examples 1-4, the device may include a shading component to derive the color values of the vertices of the first polygon from the at least one attribute interpolated to the vertices of the first polygon.

In Example 6, which includes the subject matter of any of Examples 1-5, the clipping component may clip a second visible primitive of the 2D screen image within the first area to form a second polygon representing an intersection of the first area and the second visible primitive, the second polygon sharing at least a portion of an edge with the first polygon.

In Example 7, which includes the subject matter of any of Examples 1-6, a vertex of the first polygon may share a location along a boundary of the shading pixel with a vertex of the second polygon.

In Example 8, which includes the subject matter of any of Examples 1-7, the device may include a rasterizing component to rasterize primitives of the 3D model to identify a multitude of visible primitives visible in the 2D screen image, the multitude of visible primitives including the first visible primitive.

In Example 9, which includes the subject matter of any of Examples 1-8, the rasterizing component may set a pixel resolution of the screen image to a pixel resolution of a display.

In Example 10, which includes the subject matter of any of Examples 1-9, the device may include a display to present the screen image.

In Example 11, which includes the subject matter of any of Examples 1-10, the device may include an interface to transmit screen image data representing the screen image to another device.

In Example 12, a device to render 2D imagery from 3D model data includes a clipping component to clip a first visible primitive and a second visible primitive of a 2D screen image derived from of a 3D model within an area of the screen image covered by a shading pixel to form a first polygon representing an intersection of the area covered by the shading pixel and the first visible primitive and to form a second polygon representing an intersection of the area covered by the shading pixel and the second visible primitive; a first interpolation component to interpolate at least one attribute of vertices of the first visible primitive to each vertex of the first polygon, and to interpolate the at least one attribute of vertices of the second visible primitive to each vertex of the second polygon; and a second interpolation component to interpolate color values of the vertices of the first polygon to a first point within an area covered by a first screen pixel of the screen image, and to interpolate color values of the vertices of the second polygon to a second point within an area covered by a second screen pixel of the screen image, each of the areas covered by the first and second screen pixels coinciding with the area covered by the shading pixel.

In Example 13, which includes the subject matter of Example 12, the first point may be located at a center of the first screen pixel, the second point may be located at a center of the second screen pixel, and the second interpolation component may select the vertices of the first polygon from which to interpolate the at least one attribute to the first point from among vertices of a multitude of polygons formed by the clipping component based on the location of the first point relative to boundaries of each polygon of the multitude of polygons, and may select the vertices of the second polygon from which to interpolate the at least one attribute to the second point from among vertices of the multitude of polygons based on the location of the second point relative to boundaries of each polygon of the multitude of polygons, the multitude of polygons including the first and second polygons.

In Example 14, which includes the subject matter of any of Examples 12-13, the second visible primitive may share at least a first portion of an edge with the first visible primitive.

In Example 15, which includes the subject matter of any of Examples 12-14, the clipping component may clip the first and second visible primitives to enable the first and second polygons to share at least a second portion of the edge.

In Example 16, which includes the subject matter of any of Examples 12-15, the clipping component may clip the first and second visible primitives to enable a vertex of the first polygon to share a location along a boundary of the shading pixel with a vertex of the second polygon.

In Example 17, which includes the subject matter of any of Examples 12-16, the device may include a display to present the screen image.

In Example 18, which includes the subject matter of any of Examples 12-17, the device may include a rasterizing component to set a pixel resolution of the screen image to a pixel resolution of a display.

In Example 19, which includes the subject matter of any of Examples 12-18, the device may include an interface to transmit screen image data representing the screen image to another device.

In Example 20, which includes the subject matter of any of Examples 12-19, the device may include a rasterizing component to receive an indication of an orientation of a plane of the screen image from the other device.

In Example 21, a computing-implemented method for rendering 2D imagery from 3D model data includes clipping a first visible primitive of a 2D screen image derived from of a 3D model within a first area of the screen image covered by a shading pixel to form a first polygon representing an intersection of the first area and the first visible primitive; interpolating at least one attribute of vertices of the first visible primitive to each vertex of the first polygon; and interpolating color values of the vertices of the first polygon to a point within a second area covered by a screen pixel of the screen image, the second area smaller than the first area and at least partly coinciding with the first area.

In Example 22, which includes the subject matter of Example 21, the method may include determining a size of the first area based on a characteristic of a multitude of visible primitives of the 2D screen image, the multitude of visible primitives including the first visible primitive.

In Example 23, which includes the subject matter of any of Examples 21-22, the point may be located at a center of the screen pixel, and the method may include selecting the vertices of the first polygon from which to interpolate the at least one attribute from among vertices of a multitude of polygons formed by the clipping component based on the location of the point relative to boundaries of each polygon of the multitude of polygons, and the multitude of polygons including the first polygon.

In Example 24, which includes the subject matter of any of Examples 21-23, the point may coincide with a location of a sample falling within the screen pixel, the sample employed in rasterization of the first visible primitive.

In Example 25, which includes the subject matter of any of Examples 21-24, the method may include deriving the color values of the vertices of the first polygon from the at least one attribute interpolated to the vertices of the first polygon.

In Example 26, which includes the subject matter of any of Examples 21-25, the method may include clipping a second visible primitive of the 2D screen image within the first area to form a second polygon representing an intersection of the first area and the second visible primitive, the second polygon sharing at least a portion of an edge with the first polygon.

In Example 27, which includes the subject matter of any of Examples 21-26, a vertex of the first polygon may shar3 a location along a boundary of the shading pixel with a vertex of the second polygon.

In Example 28, which includes the subject matter of any of Examples 21-27, the method may include presenting the screen image on a display.

In Example 29, which includes the subject matter of any of Examples 21-28, the method may include transmitting screen image data representing the screen image to another device.

In Example 30, which includes the subject matter of any of Examples 21-29, the method may include rasterizing primitives of the 3D model to identify a multitude of visible primitives visible in the 2D screen image, the multitude of visible primitives including the first visible primitive.

In Example 31, at least one machine-readable storage medium includes instructions that when executed by a computing device, cause the computing device to clip a first visible primitive of a 2D screen image derived from of a 3D model within a first area of the screen image covered by a shading pixel to form a first polygon representing an intersection of the first area and the first visible primitive; interpolate at least one attribute of vertices of the first visible primitive to each vertex of the first polygon; and interpolate color values of the vertices of the first polygon to a point within a second area covered by a screen pixel of the screen image, the second area smaller than the first area and at least partly coinciding with the first area.

In Example 32, which includes the subject matter of Example 31, the computing device may be caused to determine a size of the first area based on a characteristic of a multitude of visible primitives of the 2D screen image, the multitude of visible primitives including the first visible primitive.

In Example 33, which includes the subject matter of any of Examples 31-32, the point may be located at a center of the screen pixel, and the computing device caused to select the vertices of the first polygon from which to interpolate the at least one attribute from among vertices of a multitude of polygons formed by the clipping component based on the location of the point relative to boundaries of each polygon of the multitude of polygons, the multitude of polygons including the first polygon.

In Example 34, which includes the subject matter of any of Examples 31-33, the point may coincide with a location of a sample falling within the screen pixel, the sample employed in rasterization of the first visible primitive.

In Example 35, which includes the subject matter of any of Examples 31-34, the computing device may be caused to derive the color values of the vertices of the first polygon from the at least one attribute interpolated to the vertices of the first polygon.

In Example 36, which includes the subject matter of any of Examples 31-35, the computing device may be caused to clip a second visible primitive of the 2D screen image within the first area to form a second polygon representing an intersection of the first area and the second visible primitive, the second polygon sharing at least a portion of an edge with the first polygon.

In Example 37, which includes the subject matter of any of Examples 31-36, a vertex of the first polygon may share a location along a boundary of the shading pixel with a vertex of the second polygon.

In Example 38, which includes the subject matter of any of Examples 31-37, the computing device may be caused to present the screen image on a display.

In Example 39, which includes the subject matter of any of Examples 31-38, the computing device may be caused to transmit screen image data representing the screen image to another device.

In Example 40, which includes the subject matter of any of Examples 31-39, the computing device may be caused to set a pixel resolution of the screen image to a pixel resolution of a display.

In Example 41, which includes the subject matter of any of Examples 31-40, the computing device may be caused to rasterize primitives of the 3D model to identify a multitude of visible primitives visible in the 2D screen image, the multitude of visible primitives including the first visible primitive.

In Example 42, at least one machine-readable storage medium may include instructions that when executed by a computing device, cause the computing device to perform any of the above.

In Example 43, a device to render 2D imagery from 3D model data may include means for performing any of the above.

The invention claimed is:

1. A device to render two-dimensional (2D) imagery from three-dimensional (3D) model data comprising:
  a processor circuit; and
  a memory communicatively coupled to the processor circuit, the memory unit to store a control routine application operative on the processor circuit, the control routine application comprising:
    a shading pixel definition component to determine one of a boundary and an area covered by a plurality of shading pixels based on at least one characteristic of at least one of a plurality of visible primitives,
    a clipping component to:
      determine a grid of the plurality of shading pixels for shading at least a portion of the plurality of visible primitives of a 2D screen image derived from a 3D model, and
      clip a first visible primitive of the 2D screen image within a first area of the screen image covered by one of the plurality of shading pixels to form a first polygon representing an intersection of the first area and the first visible primitive,
    a first interpolation component to interpolate at least one attribute of vertices of the first visible primitive to each vertex of the first polygon,
    a second interpolation component to interpolate color values of the vertices of the first polygon to a point within a second area covered by a screen pixel of the screen image, the second area smaller than the first area and at least partly coinciding with the first area; and
    a shading component to derive the color values of the vertices of the first polygon from the at least one attribute interpolated to the vertices of the first polygon.

2. The device of claim 1, the point coinciding with a location of a sample falling within the screen pixel, the sample employed in rasterization of the first visible primitive.

3. The device of claim 1, the clipping component to clip a second visible primitive of the 2D screen image within the first area to form a second polygon representing an intersection of the first area and the second visible primitive, the second polygon sharing at least a portion of an edge with the first polygon.

4. The device of claim 3, a vertex of the first polygon sharing a location along a boundary of the one of the plurality of shading pixels with a vertex of the second polygon.

5. The device of claim 1, comprising a display to present the screen image.

6. A computer-implemented method for rendering two-dimensional (2D) imagery from three-dimensional (3D) model data comprising:
  determining one of a boundary and an area covered by a plurality of shading pixels based on at least one characteristic of at least one of a plurality of visible primitives
  determining a grid of the plurality of shading pixels for shading at least a portion of the plurality of visible primitives of a 2D screen image derived from a 3D model;
  clipping a first visible primitive of the 2D screen image within a first area of the screen image covered by one of the plurality of shading pixels to form a first polygon representing an intersection of the first area and the first visible primitive;
  interpolating at least one attribute of vertices of the first visible primitive to each vertex of the first polygon;
  interpolating color values of the vertices of the first polygon to a point within a second area covered by a screen pixel of the screen image, the second area smaller than the first area and at least partly coinciding with the first area; and
  deriving the color values of the vertices of the first polygon from the at least one attribute interpolated to the vertices of the first polygon.

7. The computer-implemented method of claim 6, the point located at a center of the screen pixel, and the method comprising selecting the vertices of the first polygon from which to interpolate the at least one attribute from among vertices of a multitude of polygons formed by the clipping component based on the location of the point relative to boundaries of each polygon of the multitude of polygons, and the multitude of polygons comprising the first polygon.

8. The computer-implemented method of claim 6, the method comprising clipping a second visible primitive of the 2D screen image within the first area to form a second polygon representing an intersection of the first area and the second visible primitive, the second polygon sharing at least a portion of an edge with the first polygon.

9. The computer-implemented method of claim 8, a vertex of the first polygon sharing a location along a boundary of the one of the plurality of shading pixels with a vertex of the second polygon.

10. The computer-implemented method of claim 6, the method comprising transmitting screen image data representing the screen image to another device.

11. At least one non-transitory machine-readable storage medium comprising instructions that when executed by a computing device, cause the computing device to:
  determining one of a boundary and an area covered by a plurality of shading pixels based on at least one characteristic of at least one of a plurality of visible primitives,
  determining a grid of the plurality of shading pixels for shading at least a portion of the plurality of visible primitives of a 2D screen image derived from a 3D model;
  clip a first visible primitive of the 2D screen image within a first area of the screen image covered by one of the plurality of shading pixels to form a first polygon representing an intersection of the first area and the first visible primitive;

interpolate at least one attribute of vertices of the first visible primitive to each vertex of the first polygon;

interpolate color values of the vertices of the first polygon to a point within a second area covered by a screen pixel of the screen image, the second area smaller than the first area and at least partly coinciding with the first area; and derive the color values of the vertices of the first polygon from the at least one attribute interpolated to the vertices of the first polygon.

12. The at least one machine-readable storage medium of claim 11, the point coinciding with a location of a sample falling within the screen pixel, the sample employed in rasterization of the first visible primitive.

13. The at least one machine-readable storage medium of claim 11, the computing device caused to clip a second visible primitive of the 2D screen image within the first area to form a second polygon representing an intersection of the first area and the second visible primitive, the second polygon sharing at least a portion of an edge with the first polygon.

14. The at least one machine-readable storage medium of claim 13, a vertex of the first polygon sharing a location along a boundary of the one of the plurality of shading pixels with a vertex of the second polygon.

15. The at least one machine-readable storage medium of claim 11, the computing device caused to present the screen image on a display.

16. The at least one machine-readable storage medium of claim 11, the computing device caused to rasterize primitives of the 3D model to identify a multitude of visible primitives visible in the 2D screen image, the multitude of visible primitives comprising the first visible primitive.

* * * * *